US 6,731,994 B2

(12) United States Patent
Heching et al.

(10) Patent No.: US 6,731,994 B2
(45) Date of Patent: May 4, 2004

(54) COMPUTER METHOD FOR PROVIDING OPTIMIZATION OF MANUFACTURING PROCESSES, WITH DYNAMIC CONSTRAINTS

(75) Inventors: Aliza Rivka Heching, Bronx, NY (US); Ying Tat Leung, Tarrytown, NY (US); Menachem Levanoni, Yorktown Heights, NY (US); Gyana R. Parija, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 09/844,116

(22) Filed: Apr. 27, 2001

(65) Prior Publication Data

US 2002/0161466 A1 Oct. 31, 2002

(51) Int. Cl.[7] ............................................. G06F 19/00
(52) U.S. Cl. ............................. 700/95; 700/28; 700/29; 700/30; 700/171; 700/173; 717/151; 364/148
(58) Field of Search ............................. 700/28, 29, 30, 700/95, 171, 173; 364/148; 717/151

(56) References Cited

U.S. PATENT DOCUMENTS

| 5,560,194 A | * | 10/1996 | Shofner et al. ............... 700/30 |
| 5,781,430 A | * | 7/1998 | Tsai ............................ 700/28 |
| 6,038,540 A | * | 3/2000 | Krist et al. ................... 700/36 |
| 2002/0156542 A1 | * | 10/2002 | Nandi ......................... 700/30 |

* cited by examiner

Primary Examiner—Leo Picard
Assistant Examiner—Charles Kasenge
(74) Attorney, Agent, or Firm—Stephen C. Kaufman, Esq.; McGinn & Gibb, PLLC

(57) ABSTRACT

A computer method for providing optimization for manufacturing processes for situations wherein there is defined a functional form $y=f(x,b)$, where x comprises a set of independent controllable variables $x=\{x_1, \ldots x_n\}$, b comprises a set of functional parameters $b=\{b_1, \ldots b_m\}$, and y comprises a dependent uncontrollable manufacturing variable, $f(x,b)$ subject to constraints on the dependent uncontrollable manufacturing variable y. The method comprises the steps of converting the constraints on y to constraints on b by using a functional estimate of y and its manufacturing variables (parameters) b; optimizing the function $f(x,b)$ subject to the converted constraints on its manufacturing variables (parameters) b; and generating from step (ii) a set of optimized values of b which can optimize the dependent manufacturing variable y.

17 Claims, 1 Drawing Sheet

COMPUTER METHOD FOR PROVIDING OPTIMIZATION OF MANUFACTURING PROCESSES, WITH DYNAMIC CONSTRAINTS

CROSS REFERENCE TO RELATED APPLICATION

The present application is related to U.S. application Ser. No. 09/696,555, filed Oct. 25, 2000, by Heching, et al. (IBM Docket YOR920000589); and, U.S. application Ser. No. 09/788,939, by Heching et al. (IBM Docket No. YOR920010161). These applications are co-pending, commonly assigned, and incorporated by reference herein.

BACKGROUND OF THE INVENTION

1. Field of the Invention

This invention relates to a computer method and system for providing optimization for manufacturing processes.

2. Introduction to the Invention

The invention is introduced by first setting forth the following known construct.

Given a functional form $y=f(x,b)$ where x is a set of independent controllable variables $x=\{(x1, \ldots xn\}$, b is a set of manufacturing variables (functional parameters) $b=\{b1, \ldots bm\}$, and y is a dependent uncontrollable variable, it is desired to optimize (e.g., maximize, minimize) $f(x,b)$, i.e. Derive a set $b^*=\{b1^*, \ldots, bm^*\}$ which optimizes $f(x,b)$ for an historical dataset comprising observations of independent variables x and their corresponding dependent variable y, subject to constraints on the dependent uncontrollable variable y, say $g(y)>0$.

Now, if the constraints were on the manufacturing parameters b, this would be normally solved as a mathematical programming problem (linear, quadratic or nonlinear programming). Here, in contrast, the constraints are on the dependent uncontrollable variable y. Accordingly, in order to still utilize the powerful mathematical programming techniques, it is necessary to convert the constraints on y to constraints on b using the functional estimate of y and its manufacturing parameters b (e.g., $g(y)=gf(x,b)>0$).

In turn, operating on historical data (sets of x and associated y) thus yields complete functional description, fully satisfying the given constraints.

SUMMARY OF THE INVENTION

The present invention is cognizant of the aforementioned functional construct. Moreover, the present invention builds upon this known functional construct, but references this known construct to impose upon it novel problems, constraints, and desiderata—of the following illustrative type.

Accordingly, to compute y at a new set of controllable variables, say x', one cannot simply plug x' into the currently optimized $f(x',b^*)$, which is based on the historical data, because there is no guarantee that the resulting y' will satisfy the constraints on the dependent variable, $g(y')>0$.

To insure satisfaction of the constraint at the new point x' we propose to add $f(x',b)$ to the set of constraints (e.g., add $gf(x',b)>0$ to the constraints), and re-run the mathematical program with the new set of constraints. Note that this may affect the resulting function $f(x,b)$ by yielding a new set $b^{**}$, even though no measurements at the new point x' were performed or observed.

If it is desired to compute values of the dependent variable at several new points, then three cases may be considered:

1) if the new points are ordered (e.g., forecasting), the preferred method is to perform sequential adding of the appropriate constraints;
2) if the new points are not ordered, one can derive y for each new point based only on historical data and its own contribution to the set of constraints;
3) alternatively, one can simultaneously derive y for all new points by adding all associated new constraints to the historical set.

We now restate these invention discoveries, by disclosing a first aspect of the present invention comprising a novel computer method for providing optimization for manufacturing processes for situations wherein there is defined a functional form $y=f(x,b)$, where x comprises a set of independent controllable variables $x=\{x1, \ldots xn\}$, b comprises a set of functional parameters $b=\{b1, \ldots bm\}$, and y comprises a dependent uncontrollable manufacturing variable, $f(x,b)$, subject to constraints on the dependent uncontrollable manufacturing variable y, the method comprising the steps of (i) converting the constraints on y to constraints on b by using a functional estimate of y and its manufacturing variables (parameters) b;

(ii) optimizing the function $f(x,b)$ subject to the converted constraints on its independent manufacturing variables (parameters) b; and (iii) generating from step (ii) a set of optimized values of b which can optimize the dependent manufacturing variable y.

Preferably, the method comprises a step (iv) of computing the dependent manufacturing variable y at a new set of the independent variables x, said x not being part of an historical set of x variables inherited from step (ii). In particular, this step preferably further comprises guaranteeing that the computed y satisfies the constraints on the dependent manufacturing variable y at the new set of independent variables x.

Preferably, the method can alternatively comprise a step (iv) of computing values of the dependent manufacturing variable at several new points of the independent variable x. In particular, this step preferably further comprises steps of determining that the new points are ordered, and, sequentially adding the appropriate constraints.

Preferably, moreover, the method can alternatively comprise steps of determining that the new points are not ordered, and, deriving why at each new point based only on historical data and y's own contribution to the set of constraints.

The method as summarized also includes an advantageous capability comprising the steps of computing values of the dependent manufacturing variable at several new points of the independent variables x, and, simultaneously deriving y for all new points by a step of adding all associated new constraints to the historical set.

In a second aspect of the present invention, we disclose a program storage device, readable by machine to perform method steps for providing optimization for manufacturing processes for situations wherein there is defined a functional form $y=f(x,b)$, where x comprises a set of independent controllable variables $x=\{x1, \ldots xn\}$, b comprises a set of functional parameters $b=\{b1, \ldots bm\}$, and y comprises a dependent uncontrollable manufacturing variable $f(x,b)$ subject to constraints on the dependent uncontrollable manufacturing variable y, the method comprising the steps of:

(i) converting the constraints on y to constraints on b by using a functional estimate of y and its manufacturing variables (parameters) b;

(ii) optimizing the function f(x,b) subject to the converted constraints on its manufacturing variables (parameters) b; and (iii) generating from step (ii) a set of optimized values of b which optimizes the dependent manufacturing variable y.

In a third aspect of the present invention, we disclose a computer for providing optimization for manufacturing processes, the computer comprising:

(i) means for inputting data defining a functional form y=fx,b), where x comprises a set of independent controllable variables x={x1, . . . xn}, b comprises a set of functional parameters b={b1, . . . bm}, and y comprises a dependent uncontrollable manufacturing variable, f(x,b) subject to constraints on the dependent uncontrollable manufacturing variable y;

(ii) means for converting the constraints on y to constraints on x by using a functional estimate of y and its manufacturing variables (parameters) b;

(iii) means for optimizing the function f(x) subject to the converted constraints on its manufacturing variables (parameters) b;

(iv) means for generating from element (iii) a set of optimized values of b which optimizes the dependent manufacturing variable y; and (v) means for displaying the set of optimized values of b and the resulting manufacturing variable y.

BRIEF DESCRIPTION OF THE DRAWING

The invention is illustrated in the accompanying drawing, in which FIG. 1 (10-32) comprises a flow chart describing a functional operation of the subject matter.

DESCRIPTION OF THE PRESENT INVENTION

Figure 1:
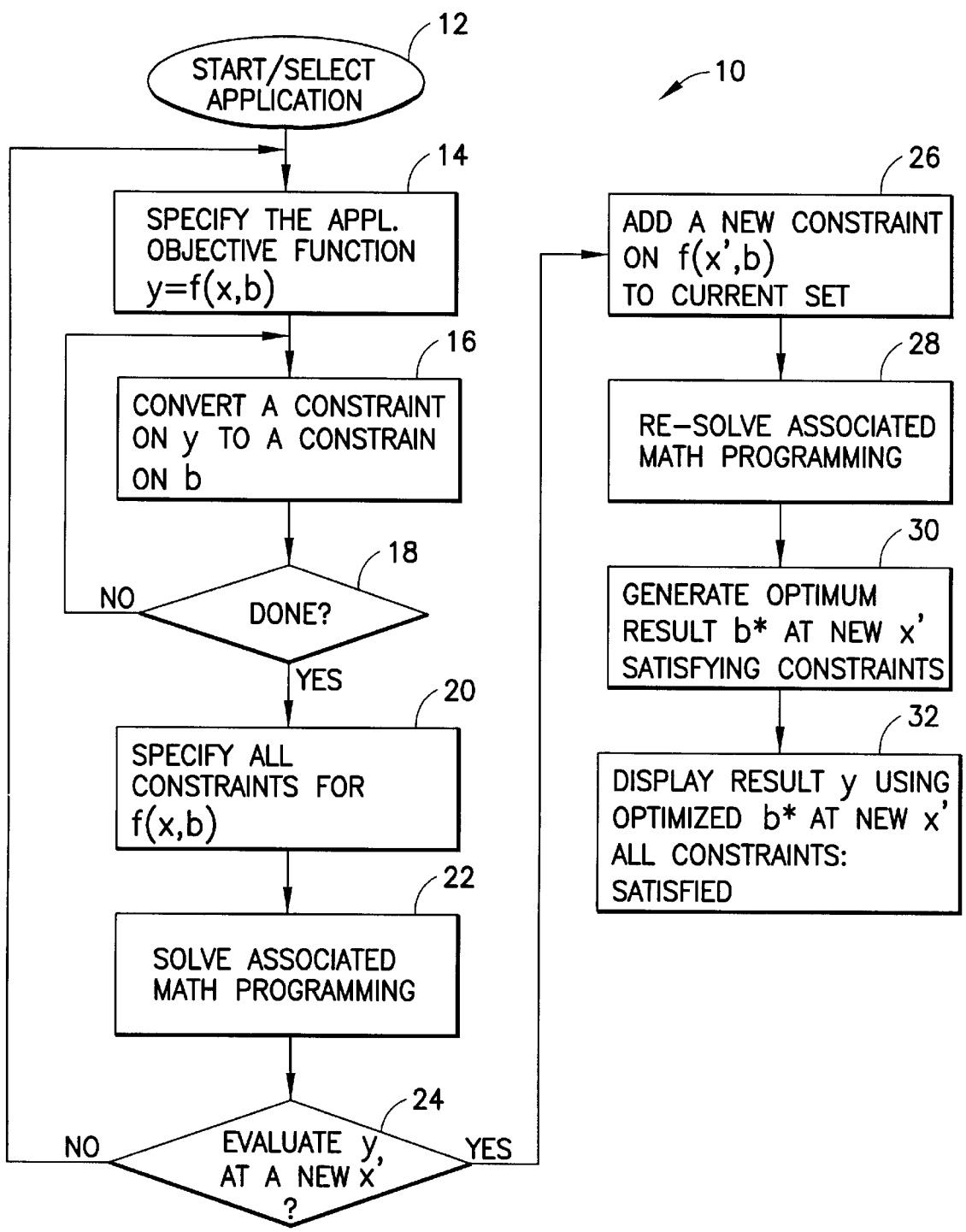

We have asserted above that to compute y at a new set of controllable variables, say x', one cannot simply plug x' into the current f(x',b*), which is based on the historical data, because there is no guarantee that the resulting y' will satisfy the constraints on the dependent variable, g(y')>0.

To insure satisfaction of the constraint at the new point x', we propose to add f(x',b) to the set of constraints (e.g., add gf(x',b)>0 to the constraints), and re-run the mathematical program with the new set of constraints. Note that this may affect the resulting function f(x,b) even though no measurements at the new point x' were performed or observed.

If it is desired to compute values of the dependent variable at several new points, then three cases may be considered:

1) if the new points are ordered (e.g., forecasting), the preferred method is to perform sequential adding of the appropriate constraints;

2) if the new points are not ordered, one can derive y for each new point based only on historical data and its own contribution to the set of constraints;

3) alternatively, one can simultaneously derive y for all new points by adding all associated new constraints to the historical set.

As a specific example, consider the case of constrained linear regression where the constraint is on the dependent variable. In this case, the functional form is: y=b1x1+b2x2+e, where y represents the dependent variable (say semiconductors chips yield), x1 is an independent variables (say line width), x2 is another independent variable (say humidity), b1 and b2 are model coefficients (to be determined), and e is a residual noise (to be minimized via adjustments of b1 and b2).

Historical data provide a set of y values and a numerical "design" matrix X, consisting of two columns (for x1 and x2). To perform the regression using the given set of observations y and the "design" matrix X, one preferably minimizes the square error (y-Xb,y-Xb) where b is a vector of b1 and b2. The regression preferably searches for optimal values of b which minimize the squared error. In addition, there are constraints on y, for example, y>0 (if y represents yield than y>0 insures no negative yield values). One may also have constraints on x, for example x1>0 (if x1 represents thickness than x1>0 insures no negative thickness). The constraints on X1 are typical for linear programming problems. The constraints on y can be included only by replacing them with their functional estimates Xb. The problem, then, can be solved via linear programming routines, yielding optimized values of b1 and b2.

If, however, it is wished to predict y for a new point, not included in the historical set X (e.g., yield computation at a new thickness and humidity values), using the parameters derived from the historical data by plugging x1' and x2' result in y'=b1x1'+b2x2' where y' may be negative. In this case, the solution does not satisfy at least one constraint and is therefore incorrect. The solution provided in this invention guarantees consistent results satisfying all constraints. The solutions entails adding a new constraint for the new point (e.g., b1x1'+b2x2'>0). Note that here a constraint has been added at a point that has not yet been observed, i.e., we are proposing to modify the resulting function (i.e., modify the coefficients b) to guarantee consistency, without observing y at the new point. In other words, we are adding a new constraint at the new point without adding the corresponding error term to the squared error to be minimized.

It is well understood that the computer system and method of the present invention can be implemented using a plurality of separate dedicated or programmable integrated or other electronic circuits or devices (e.g., hardwired or logic circuits such as discrete element circuits, or programmable logic devices such as PLDs, PLA, PALs, or the like). A suitably programmed general purpose computer, e.g., a microprocessor, microcontroller, or other processor devices (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the FIGURE.

What is claimed:

1. A computer method for providing optimization for manufacturing processes for situations wherein there is defined a functional form y=f(x,b), where x comprises a set of independent controllable variables x={x1, . . . xn}, b comprises a set of functional parameters b={b1, . . . bm}, and y comprises a dependent uncontrollable manufacturing variable, f(x,b) subject to constraints on the dependent uncontrollable manufacturing variable y, the method comprising:

converting the constraints on y to constraints on b by using a functional estimate of y and its manufacturing variables (parameters) b;

optimizing the function f(x,b) subject to the convened constraints on its manufacturing variables (parameters) b; and generating from an optimized function f(x,b), a set of optimized values of b which can optimize the dependent manufacturing variable y.

2. The computer method according to claim 1, further comprising:

computing the dependent manufacturing variable y at a new set of the independent variables x, said x not being part of an historical set of x variables inherited from said optimized function f(x,b).

3. The computer method according to claim 2, further comprising:

guaranteeing that the computed y satisfies the constraints on the dependent manufacturing variable y at the new set of independent variables.

4. The computer method according to claim 1, further comprising:

computing values of the dependent manufacturing variable for new points of the independent variable x.

5. The computer method according to claim 4, further comprising:

determining that the new points are ordered; and sequentially adding the appropriate constraints.

6. The computer method according to claim 4, further comprising:

determining that the new points are not ordered; and deriving y at a new point based on historical data and a contribution of y to the set of constraints.

7. The computer method according to claim 4, further comprising:

simultaneously deriving y for said new points by adding all associated new constraints to the historical set.

8. A program storage device, readable by machine to perform a method for providing optimization for manufacturing processes for situations wherein there is defined a functional form y=f(x,b), where x comprises a set of independent controllable variables x={x1, . . . xn}, b comprises a set of functional parameters b={b1, . . . bm}, and y comprises a dependent uncontrollable manufacturing variable, f(x,b) subject to constraints on the dependent uncontrollable manufacturing variable y, the method comprising:

converting the constraints on y to constraints on b by using a functional estimate of y and its manufacturing variables (parameters) b;

optimizing the function f(x,b) subject to the converted constraints on its manufacturing variables (parameters) b; and generating from an optimized function f(x,b), a set of optimized values of b which can optimize the dependent manufacturing variable y.

9. A computer for providing optimization for manufacturing processes, the computer comprising:

an input device for inputting data defining a functional form y=f(x,b), where x comprises a set of independent controllable variables x={x1, . . . xn}, b comprises a set of functional parameters b={b1, . . . bm}, and y comprises a dependent uncontrollable manufacturing variable, f(x,b) subject to constraints on the dependent uncontrollable manufacturing variable y;

a processor for converting the constraints on y to constraints on x by using a functional estimate of y and its manufacturing variables (parameters) b, optimizing the function f(x,b) subject to the converted constraints on its manufacturing variables (parameters) b, and generating from an optimized function f(x,b), a set of optimized values of b which optimizes the dependent manufacturing variable y; and a display device for displaying the set of optimized values of b and the resulting manufacturing variable y.

10. The computer according to claim 9, wherein said processor optimizes said function f(x,b) for an historical dataset.

11. The computer according to claim 10, wherein said historical dataset comprises a set of independent controllable variables, x, and dependent uncontrollable manufacturing variables, y, which are associated with said set of independent controllable variables, x.

12. The computer according to claim 9, wherein said processor computes the dependent manufacturing variable, y, at a new set of the independent variables, x, said independent variables, x, not being part of an historical set of independent variables, x, inherited from said optimized function f(x,b).

13. The computer according to claim 12, wherein said resulting manufacturing variable, y, satisfies the constraints on the dependent manufacturing variable, y, at the new set of independent variables.

14. The computer according to claim 9, wherein said processor computes values of the dependent manufacturing variable, y, for new points of the independent variable, x.

15. The computer according to claim 14, wherein said processor determines that said new points are ordered, and sequentially adds the appropriate constraints.

16. The computer according to claim 14, wherein said processor determines that said new points are not ordered, and derives y at a new point based on historical data and a contribution of y to the set of constraints.

17. The computer according to claim 14, wherein said processor simultaneously derives y for said new points by adding all associated new constraints to an historical dataset.

* * * * *